Patented Nov. 16, 1926.

1,607,405

UNITED STATES PATENT OFFICE.

HIRAM S. LUKENS, OF PHILADELPHIA, PENNSYLVANIA, ASSIGNOR TO SOLIDIFIER CORPORATION, OF PHILADELPHIA, PENNSYLVANIA, A CORPORATION OF DELAWARE.

WATER-REPELLENT COMPOSITION AND METHOD OF MAKING THE SAME.

No Drawing. Application filed June 15, 1926. Serial No. 116,069.

My invention relates to the making of products from plastic compositions, with or without the use of aggregates, and particularly to the plastic compositions employed in connection with the building trades.

This application is a continuation in part of my pending application, Serial No. 48,140, filed August 4, 1925, for composition of matter and method of making the same.

The object of my invention is to improve the water-repellent or water-resistant properties of such products; and the invention is particularly applicable to factory-shaped articles, although it may be used for making floors or other parts which are shaped in place. While particularly adapted for the binding of aggregates, it may be employed in composition articles, such as those made of gypsum, where the pulverulent material acts as its own binder with or without the addition of aggregates.

In former attempts to improve the water-repellent characteristics of such compositions by the introduction of water-repellent substances in the mixture, two general methods have been proposed.

The first method was to introduce water-repellent substances in a state of subdivision into the dry materials before adding water or the necessary liquid, to cause the cementing agent to react and bind the material together. Examples of such a method are those proposing to add water-insoluble soaps or atomized paraffin or waxes or combinations of the same to Portland cement or to a portion of the aggregate used in making the product. In such cases, the distribution of the water-repellent material is not uniform, but is segregated and will be irregular and dependent upon the efficiency of the mixer.

A second method consisted of mixing an emulsion of the water-repellent substances with the material forming the composition, the water-repellent substances constituting the internal or dispersed phase of the emulsion and water being usually employed for the external phase of the emulsion. As one example of this second method, it has been proposed to emulsify water-resistant materials, such as waxes, by means of soluble soaps, such as sodium palmitate or sodium stearate or sodium oleate, and to add such an emulsion to Portland cement. In such cases, the calcium hydroxide content of the Portland cement converts these soluble soaps into insoluble lime soaps, giving sodium hydroxide as a byproduct. This sodium hydroxide will absorb carbon dioxide from the air, and thereby be converted into sodium carbonate and water. The sodium carbonate is of greater volume than the corresponding amount of sodium hydroxide and consequently this change sets up a swelling tendency in the material which will cause strains therein and weaken its strength and may disrupt it. Hence, in such cases, deleterious byproducts result from the changing of the soluble soaps into insoluble soaps. Furthermore, the sodium carbonate is water-soluble and in addition to the swelling action it will, if subjected to water vapor or water, leach out of the mixture and leave voids.

As another example, it has been proposed to add insoluble soaps, such as aluminum palmitate and calcium stearate, suspended in a solution of water and ammonia. Tests on products thus made, however, showed a loss of 30% or more of strength over that shown by the same material when the soaps were omitted; moreover, such substances are unstable and tend to break down in time by oxidation both through the action of atmospheric agencies and by interaction with the constituents of the cement, or by a combination of both causes of disintegration.

After long experimentation upon the second general method above referred to, I have found why former proposed methods were unsuccessful and have discovered methods by which the difficulties may be overcome and permanent water-repellent properties imparted by observing the following conditions.

1. The water-repellent-substance should be stable and unaltered by atmospheric agencies of all kinds or by the constituents of the cement.

2. The precipitation, cracking or flocculation of the emulsion of the water-repellent substance should be irreversible and should yield no byproducts that are altered by atmospheric agencies, or are soluble in or softened by water, or that react unfavorably with the constituents of the cement.

3. The precipitation, cracking or flocculation of the emulsion or suspension should be conducted in place, i. e., should be brought about at the time of mixing the cement, mortar, or plastic mass just preceding its pouring or other means of application.

As an example of water-repellent materials conforming to the first condition, I will mention the petroleum hydrocarbons of the paraffin series. I do not, however, desire to limit myself to the use of such materials, but may use other materials which remain stable and unaltered under the conditions of use, and are capable of being brought into the form of an emulsion or colloidal suspension such as certain natural waxes, cellulose nitrate, gilsonite, pitches either natural or artificial, asphalt, etc.

As regards the second condition, I would point out that, if the cracking, precipitating or flocculating material remains as a constituent of the composition, the reforming of an emulsion or suspension is prevented, if the substance be subsequently subjected to the action of water or moisture. Hence, it is desirable to use some normal constituent of the cement or binder as a cracking agent. Where this is not possible, I prefer to add to the mixture either while dry, or after wetting with my type of emulsion, a suitable cracking agent which will act to crack or flocculate the emulsion and yet will yield no byproducts of an objectionable character, such as are formed in the use of soaps of fatty acids in connection with Portland cement, as above referred to. I do not intend, however, to limit myself to any particular cracking or flocculating agent, so long as the agents used will form no deleterious byproduct nor introduce materials which tend to weaken the composition or contribute to water absorption or disintegration by the action of water.

In carrying out my invention in connection with a material or binder of a general Sorel cement type with or without aggregate, I introduce into the mixture, for example, an appropriate amount of an emulsion containing a water-repellent agent, such as an emulsion of oil and water. Some cheap petroleums contain natural emulsifying agents (such as certain sulphonic acids or their derivatives), and these may be mixed up directly with the water; or an oil may be made into an emulsion with a solid, such as talc, as for example, in a grinding mill; or the water-repellent material, such as oil, may be dispersed in water by means of aluminum hydroxide; or the water-repellent material, such as oil, may be dispersed in a liquid suspension wholly by mechanical agencies, as by a suitable colloid mill. In this case, the magnesium chloride of the Sorel cement mixture will act to crack the emulsion in place without the formation of any deleterious byproduct.

For example, I have prepared a dry mixture of:

Parts.
Standard 20–30 mesh Ottawa sand_____ 5
Silex (120 mesh)_____ 2
Plastic calcined magnesite_____ 1
Magnesium chloride with 6 parts of water of crystallization_____ 1

I then prepared an emulsion of oil by agitating with water an oil containing natural emulsifying agents. Such oils are well known in the trade and are common in petroleum fractions from certain districts. The oil is usually in the ratio of about one part of oil to nine parts of water, although this ratio may be widely varied. This emulsion was then added to the dry mixture above described to an amount sufficient to form a paste or mortar and the mixing continued until the magnesium chloride passed into solution. As the magnesium chloride dissolved, the oil particles dispersed through the liquid constituent tended to separate and effectually wet or coat the solid particles. These oil particles had little or no effect in decreasing the Sorel reaction of the magnesium chloride with the magnesium oxide. This is shown by the fact that the addition of the emulsion did not materially affect the strength of the resultant material. The water formed in cracking evaporates.

Products thus produced lose but 10% to 20% of their tensile strength on exposure to water, while when ordinary Sorel cement is used, the decrease in strength is much greater and more rapid.

It will be noted that in the above example the cracking agent formed a part of the binder, but I may add to the mixture either while dry, or after wetting with my type of emulsion a cracking agent such as any well known electrolyte, in cases where the binder is of such a nature that this is needed in order to effectuate the cracking of the water-repellent emulsion.

I am aware that the alkaline earth salts of the sulphonic acids are in general soluble, but on leaching products prepared in the manner described with water, no sulphonate of the alkaline earth is dissolved. For this reason, I infer that some compound other than a soluble sulphonate of an alkaline earth is produced and that this compound is substantially insoluble in water.

In the case of Portland cement, one preferable procedure is as follows: If from 1% to 3% of a suitable water-repellent material, such as paraffin wax, be brought into a highly dispersed condition in water by means of treatment in a colloid mill, or dispersed through the medium of a colloid, such as zinc hydroxide prepared by dialysis, and such an emulsion be added to a Portland cement mixture in place of part or all of the water normally used for making such a mixture, the soluble lime salts of the Portland cement bring about a cracking or flocculation of the emulsion or suspension, thereby precipitating the water-repellent materials on the solids. The emulsion contains no deleterious materials to weaken the article. In this manner, improved resistance to moisture absorption may be secured in a wide variety of Portland cement products, and with the procedures above mentioned, no deleterious byproducts will be produced. Furthermore, the precipitation is rendered irreversible by the continued presence of the flocculating or cracking agent.

The process may also be applied to plastic compositions, such as gypsum products. When common plaster of Paris articles are made they take up water, and the gypsum is hydrated. Such products may be made more resistant to the action of water if, instead of mixing water with the plaster or the plaster mixed with an aggregate, a suitable emulsion be substituted for part or all of the water. In this case, for example, I may emulsify a water-repellent material which complies with my requirements, by purely mechanical means in conjunction with the use of a solid water-insoluble emulsifying agent. This may be carried out by grinding the water-repellent agent with the solid, such as talc, and with water in a suitable trituration apparatus, such as a colloid mill. When a suitable amount of such an emulsion is mixed with the gypsum, sufficient calcium sulphate dissolves to provide an electrolyte of appropriate concentration to crack the emulsion and thereby cause the water-repellent agent to separate throughout the mass. No deleterious compounds are produced, and a product is thus formed which is far more resistant to the action of water than are ordinary gypsum products.

The water-repellent material used in my emulsion or suspension may be of organic, inorganic or mixed type, so long as the same complies with my requirements.

I prefer to crack the emulsion without chemical change of the water-resistant materials. With some emulsions this is not possible, and in such cases where there is chemical change it is essential that all of the non-volatile portions of the reaction products, i. e., those which do not evaporate—are water-repellent and stable.

I may employ water-resistant materials, such as cellulose nitrate or cellulose nitrate in conjunction with suitable solvents. If a solvent is used, the nitrate solution may be dispersed by means of appropriate emulsifying agents such as talc. Natural and artificial waxes and bitumens will all yield favorable results under appropriate conditions. In all cases, in order to obtain my improved results, the suspension of water-repellent material should not contain material which materially weakens the article and must be cracked in place. Furthermore, there must be no deleterious byproducts set up in the cracking operation, and the cracking must be of such a nature that the precipitation effected thereby is irreversible in the presence of water. By the terms "cracking" or "flocculating", I intend to include the use of special flocculating means as well as the well known action of an electrolyte, but I do not intend to include thereby the mere drying of an emulsion or suspension in place in the mixture.

The materials above set forth act as water-repellent agents in the final article, which agents are stable under the conditions of use, that is, they do not oxidize or disintegrate as do the insoluble soaps when so used.

I consider myself the first to add to a plastic composition an emulsion or suspension of a finely divided stable water-repellent agent free from agents which materially weaken the product, and then precipitate the water-repellent agent in an irreversible form, while at the same time avoiding any deleterious byproducts as the result of this action.

Articles made from plastic compositions in accordance with my invention are not only highly water-resistant, but have the strength generally required in building materials. Such articles are of good structural strength and high commercial value.

By the term "emulsion" in my claims, I intend to cover a finely divided suspension of the water-repellent material which is preferably in the form of a colloidal suspension, whether liquid or pasty.

By the term "Sorel-plaster-cement type" in certain claims I intend to include materials such as binders of the general Sorel type, gypsum products, and lime cements, but to exclude Portland cement.

I claim:

1. In the manufacture of compositions, the steps consisting of forming a composition containing a binding or cementing ingredient and also containing an emulsion of a water-resistant stable material, cracking the water-resistant ingredient by means of a cracking agent, and producing a water-repellent article in which all of the non-volatile products of cracking are water-resistant and stable.

2. In the manufacture of compositions, the steps consisting of mixing an aggregate with binding material, incorporating in the mixture an emulsion containing a water-resistant stable constituent, and cracking the emulsion in the mixture by means of a cracking agent, all of the non-volatile products of cracking being water-resistant and stable.

3. In the manufacture of compositions, the steps consisting of forming a composition containing a binding ingredient of the Sorel-plaster-cement type and also containing an emulsion of a water-resistant stable constituent, cracking the emulsion of the water-resistant constituent in the mixture by means of a cracking agent, and producing cracked products all of the non-volatile constituents of which are water-resistant and stable.

4. In the manufacture of compositions, the steps consisting of forming a composition containing a cementing ingredient which contains a cracking agent and also contains an emulsion of a water-resistant stable constituent, and cracking the emulsion of the water-resistant constituent by the cracking agent of the binder while producing products all of the non-volatile portions of which are water-resistant and stable.

5. In the manufacture of gypsum compositions, the steps consisting of forming a gypsum composition containing an emulsion of a water-resistant stable material, cracking the water-resistant ingredient by means of a cracking agent, and producing a water repellent gypsum article in which all the non-volatile products of cracking are water resistant and stable.

6. As a new article of manufacture, a composition of the strength usually required in building material, containing cementing materials and stable water resistant materials, the whole having the characteristics resulting from cracking in the mixture an emulsion, all of the non-volatile portions of which are water resistant and stable.

7. As a new article of manufacture, a composition of the strength usually required in building material, containing a gypsum binder and stable water resistant materials, the whole having the characteristics resulting from cracking in the mixture an emulsion, all of the non-volatile portions of which are water resistant and stable.

In testimony whereof I have hereunto set my hand.

HIRAM S. LUKENS.